(12) United States Patent
Williams

(10) Patent No.: US 11,038,302 B2
(45) Date of Patent: Jun. 15, 2021

(54) PLUGGABLE CABLE CHANNEL

(71) Applicant: Steven J Williams, San Jose, CA (US)

(72) Inventor: Steven J Williams, San Jose, CA (US)

(*) Notice: Subject to any disclaimer, the term of this patent is extended or adjusted under 35 U.S.C. 154(b) by 0 days.

(21) Appl. No.: 16/369,805

(22) Filed: Mar. 29, 2019

(65) Prior Publication Data
US 2020/0313341 A1    Oct. 1, 2020

(51) Int. Cl.
| | |
|---|---|
| *H01R 13/516* | (2006.01) |
| *H01R 13/518* | (2006.01) |
| *H01R 13/60* | (2006.01) |
| *H01R 13/58* | (2006.01) |

(52) U.S. Cl.
CPC ......... *H01R 13/516* (2013.01); *H01R 13/518* (2013.01); *H01R 13/58* (2013.01); *H01R 13/60* (2013.01)

(58) Field of Classification Search
CPC ...... H01R 13/518; H01R 13/73; H01R 27/02; H01R 13/62; H01R 13/629
See application file for complete search history.

(56) References Cited

U.S. PATENT DOCUMENTS

| | | | | |
|---|---|---|---|---|
| 7,453,042 B2* | 11/2008 | Low | ................. | H02G 15/013 174/93 |
| 7,614,897 B2* | 11/2009 | Lopez | ................. | H01R 13/516 439/248 |
| 8,481,869 B2* | 7/2013 | Coulson | ................. | B65H 75/362 174/650 |
| 8,545,260 B2* | 10/2013 | Zhou | ................. | H01R 13/72 191/12.4 |

OTHER PUBLICATIONS https://en.wikipedia.org/wiki/Countersink, retrieved Jun. 2, 20 (Year: 2020).*

* cited by examiner

*Primary Examiner* — Ross N Gushi

(57) ABSTRACT

Disclosed are pluggable cable channels having internal cavities and passageway conduits to provide removable holding devices for data and or power cables in electrical and electronic encasements. Holding a data and or power cable in the pluggable cable channel allows different cables to be used in the same channel-way by changing the plug, thus assisting in the preservation of the enclosure investment and use for different applications. Some embodiments include a cavity to hold the end of the cable, a keyway to pass a length of the cable into the body conduit, and a routing channel in the body to exit the cable to a specific location in relationship to the plug, a set screw or clamp to secure the cable to a location in the plug body, and a body flange to attach the plug to the encasement. The flange may be angled to mate flush with perpendicular and non-perpendicular to the channel-way.

10 Claims, 9 Drawing Sheets

PLUGGABLE CABLE CHANNEL

BACKGROUND OF THE INVENTION

The present invention relates primarily to the mechanical structure, routing, and attachment mechanisms of cable-based electrical conductor channels from the outside into, inside of, inside of to the outside, through, and between, electronic and electrical equipment encasements and designs in the art thereof. One or more singular electrical conductors of data, and in some implementation cases power, collected into a flexible bundle, often mated with a mechanical structure to provide an electrical interface connection at each of the two ends of the conductor bundle, are herein referred to as a cable channel. A solution that holds the cable channel and coverts a portion into a rigid plug is the basis for the invention of the Pluggable Cable Channel.

Industry standard electronic and electrical bus protocols, as well as widely used proprietary bus protocols, differ greatly in their physical layer implementations and mechanical designs. These bus protocols include, however are not limited to: Ethernet, Universal Serial Bus (USB), High Definition Multimedia Interface (HDMI), Display Port (DP), a group of audio bus protocols, other interface protocols, as well as power centric protocols. A myriad of differing cable channel constructs are available and required to support all of these interface technologies. Future standards based interface protocols, proprietary based bus interface protocols, and the cable channels that will support these protocol technologies, hold the potential for modifications to ever-increasing plural conductors of data in their transmission channels, data rates carried by these channels, and in some cases evolution of singular and plural power delivery conductor sets of increasing power control complexity. The physical layer of these interface protocol technologies mentioned, as well as others, manifest their implementations into varying singular, sometimes plural, cable channel types. The cable channel's bundle structure and the electrical interface where the channel terminates the conductor bundle, must also, therefore, vary greatly. The ends of the cable channel, where the conductor bundle may terminate into a mechanical structure designed to allow the channel to electrically and mechanically interconnect to electronic or electrical equipment, is herein referred to as the terminus.

Flexibility in the use of different electrical interface protocols in a singular encasement mechanical architecture is gained with the Pluggable Cable Channel invention. Industry standard and proprietary bus protocols, past, present, and future, and their resulting differing cable channel mechanical types and constructs, can be implemented into a singular pluggable and thus exchangeable, mechanical structure with the Pluggable Cable Channel. A common mechanical structure to connect various interface protocols for use with a myriad of different encasements for computers, electronic devices, electronic accessories, as well as power control and delivery systems is gained. A new option for data path and or power path design with the benefit of extending the life of the mechanical design of encasements is therefore facilitated.

BRIEF SUMMARY OF THE INVENTION

Embodiments of the Pluggable Cable Channel provide a structured pathway for routing and securing conductors of data, as well as in many cases power, on the surface of, from the surface into, inside of, through, from a point inside to a point outside, and between a wide variety of electronic and electrical encasements. When used in conjunction with a cable channel, the invention holds a cable channel length, often implemented with a sheathed bundle of conductors, and its cable channel terminus, forming an elongated rigid electrical plug. Embodiments of the invention provides a C-shaped protective sheath formed in an elongated plug body creating a conduit structure, herein called a cable channel conduit, for securing the path of a cable channel length, while holding the cable channel terminus stationary. The Pluggable Cable Channel can support various internal cable channel conduit dimensions, supporting various cable channel types, while the external mechanical structure of the elongated plug body can remain constant. The Pluggable Cable Channel can be secured to an associated encasement channel-way. Pluggable Cable Channels of similar external form can be interchanged in a channel-way allowing the use of different internal cable channel types within the same associated encasement channel-way Therefore, flexibility in choosing and changing cable channel types and thus their protocols while having more flexibility in a singular encasement mechanical design, is enabled.

Present invention embodiments include an elongated plug body with a cable channel conduit formed therein to hold a cable channel in place, along the elongated plug body length The cable channel conduit spans between the distal end tip of a clip-less terminus socket entry point and the cable channel conduit exit point of the elongated plug body, thus forming a channelized pathway. The cable channel conduit exit point can be at the end of a C-shaped cable channel passageway or via the exit location of a cable channel routing passageway. The Pluggable Cable Channel provides a rigid body in the form of a pluggable holding structure, that can be as an elongated electrical plug when used in conjunction with a cable channel. The Pluggable Cable Channel can span a channel-way of an associated encasement, from the encasement channel-way entry or attachment point, to the electrical interface location. Clip-less terminus socket dimensions of the Pluggable Cable Channel's elongated plug body including the width, length, depth, and location of the clip-less terminus socket in relationship to the elongated plug body, can be varied to support different cable channel types, their differing terminus mechanical designs, and the electrical interface location relative to the elongated plug body length. Pluggable Cable Channel embodiments also include various elongated plug body lengths in support of differing channel-way spanning distances present in associated encasement designs. Embodiments may also vary the elongated plug body thickness in order to support higher cable channel conductor counts and gauges. Pluggable Cable Channels can be made to be interchangeable within a channel-way, while the cable channels inside of the elongated plug body may differ in conductor count, protocol, and structure.

Other embodiments of the invention include the Pluggable Cable Channel extending and securing a cable channel from the entry point into one side of an encasement via the encasement channel-way, to provide the cable channel electrical interface stationary in position on another surface of the same encasement. This application of the Pluggable Cable Channel may be useful where a data channel is needed between two encasements, or through one.

In other embodiments the Pluggable Cable Channel may provide a cable channel passageway originating from the inner regions of an encasement to a location external to the encasement.

Still other embodiments may provide for a Pluggable Cable Channel to plug into a port interface of an encasement and span the distance from a port interface to an electrical interface location internal to the equipment encasement.

BRIEF DESCRIPTION OF DRAWINGS

These figures listed here in this brief description of the accompanying drawings, are used in the detailed description section that follows. The listed figures include reference numbers to present embodiment details for clarity. Where instances of a similar or identical embodiment feature are detailed in follow on figures, use of the original reference number of the first entity instance in the previous drawings may be made.

DETAILED DESCRIPTION

Figure 1A:
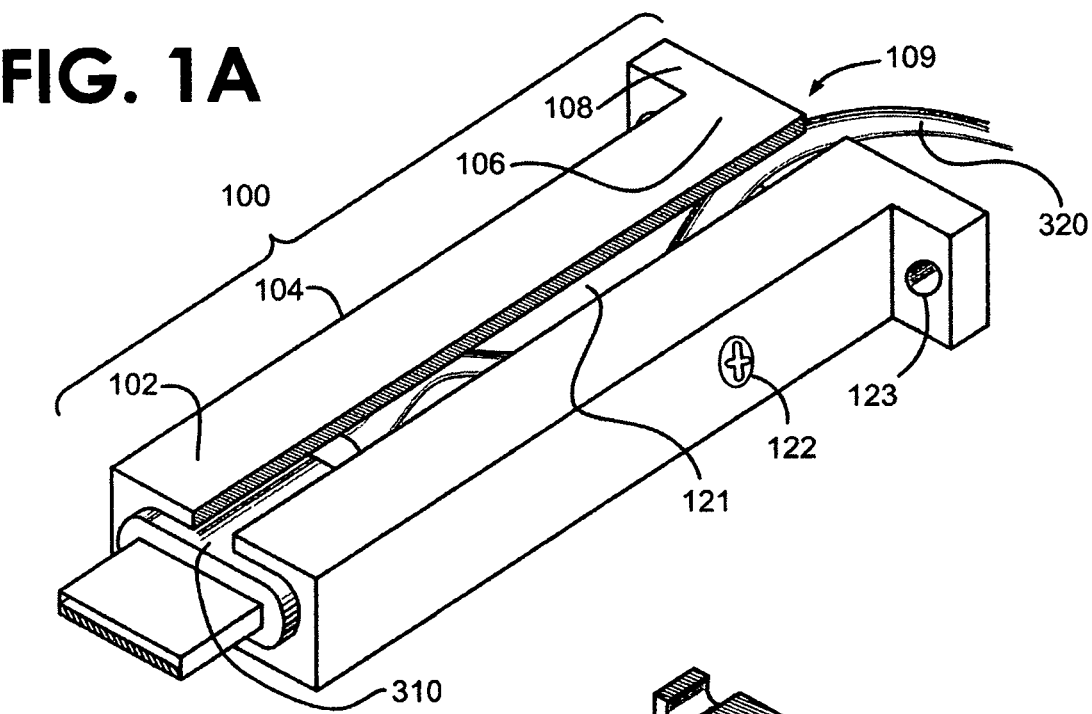
FIGS. 1A and 1B are abridged perspective view of one of many possible embodiments of the Pluggable Cable Channel invention, shown in combination with a cable channel assembled into the elongated plug body length that may be used with the invention.

FIG. 1a illustrates one of many possible embodiments of the Pluggable Cable Channel 100. The elongated plug body length 104, forming a C-shaped protective sheath surrounding a cable channel conduit, holds a portion of a cable channel stationed in the elongated plug body 104, from a first distal end 102 to an exit point 109 at a base of a second distal end 106. A cable channel terminus 310 that can be used in conjunction with the Pluggable Cable Channel is adjoined to a first distal end 102 of the Pluggable Cable Channel, and a portion of a cable channel length 320 is guided via the cable channel conduit of the elongated plug body 104. The cable channel length 320 in this embodiment is routed through the base 106 and out of the elongated plug body length at the end of a C-shaped cable channel passageway. Herein this embodiment the exit point 109 of the Pluggable Cable Channel is at the end of a C-shaped cable channel passageway formed in a second section of the cable channel conduit adjacent to the second distal end 106 of the elongated plug body 104 opposite from the terminus 310 in a first section of the cable channel conduit at the first distal end 102. Embodiments of the invention include elongated plug body lengths 104 rectangular in shape, as the present embodiment illustrates, oval, other multi-sided or curved forms, and some with surface features for fixing the Pluggable Cable Channel's orientation inside of the recess of a channel-way. Assembling a cable channel into the Pluggable Cable Channel's 100 elongated plug body length 104 includes passing a cable channel length 320 into the elongated plug body length 104 through the cable channel passing keyway slot 121. The cable channel terminus 310 is shown seated into the clip-less terminus socket at a first distal end 102. A channel clamp 122 of this embodiment is rotated to secure a section of a length of the cable channel to a point along the elongated plug body length. The Pluggable Cable Channel elongated plug body length can be inserted into a recess of a channel-way and fastened to the channel-way via the cavities 123 of the base tabs 108.

Figure 1B:
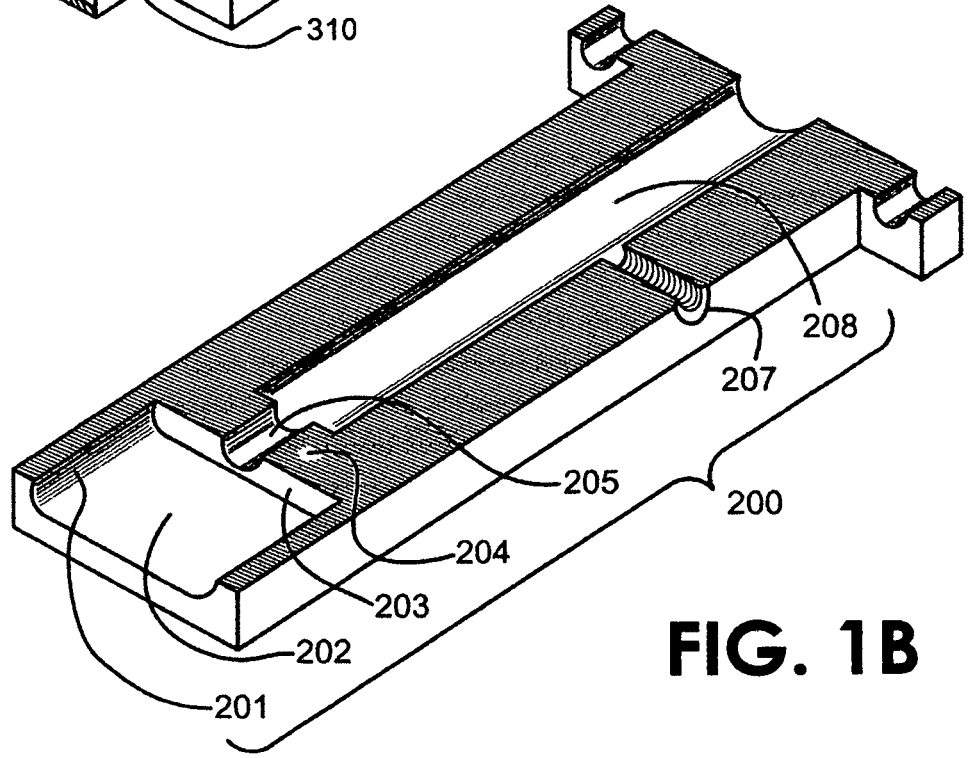

FIG. 1b illustrates a cross section of one embodiment's implementation of the Pluggable Cable Channel showing a cross section of the cable channel conduit 200, that forms part of the C-shaped protective sheath, used in conjunction with a cable channel to station a cable channel to the elongated plug body. The clip-less terminus socket's 202 concaved cylindrical walls 201 hold a cable channel terminus stationed in the clip-less socket while seated against a holed wall 203. The holed wall 203 is the floor of the clip-less terminus socket 202. A hole 205 in a holed wall cross member 204 enables a length of cable channel to pass from the base of the cable channel terminus stationed in the clip-less terminus socket 202 into the C-shaped cable channel passageway 208. A channel clamp that secures a length of cable channel along the elongated plug body is implemented with this embodiment via rotation into the cavity at 207.

Figure 2:
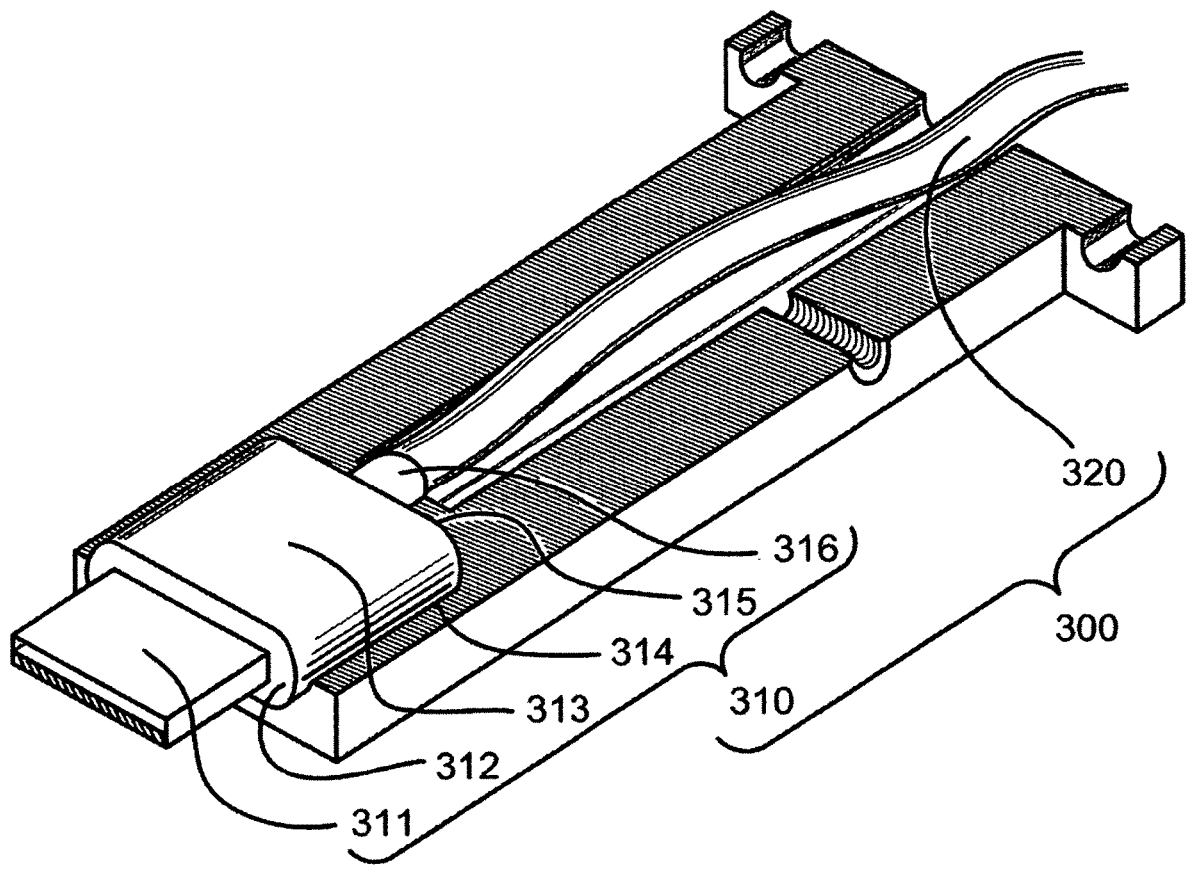
FIG. 2 is an abridged perspective view of one of many possible cable channel types that may be used in conjunction with the invention.

FIG. 2 illustrates one of many cable channel types 300 that can be used in conjunction with a Pluggable Cable Channel. Key features of a cable channel are the mechanical structure at a distal end shown herein called the cable channel terminus 310 that houses the electrical interface 311 to a cable channel, and the cable channel length 320. The cable channel terminus 310 with an electrical interface 311 form one, of typically two, cable channel ends that are connected together by the cable channel length 320. Key features of the cable channel terminus are the bottom shoulder 315, the top of the terminus 312, the convex sides and thickness of the terminus 314, as well as the width of the terminus 313. A cable channel length hosel providing strain relief from the cable channel length is shown at 316.

Figure 3:
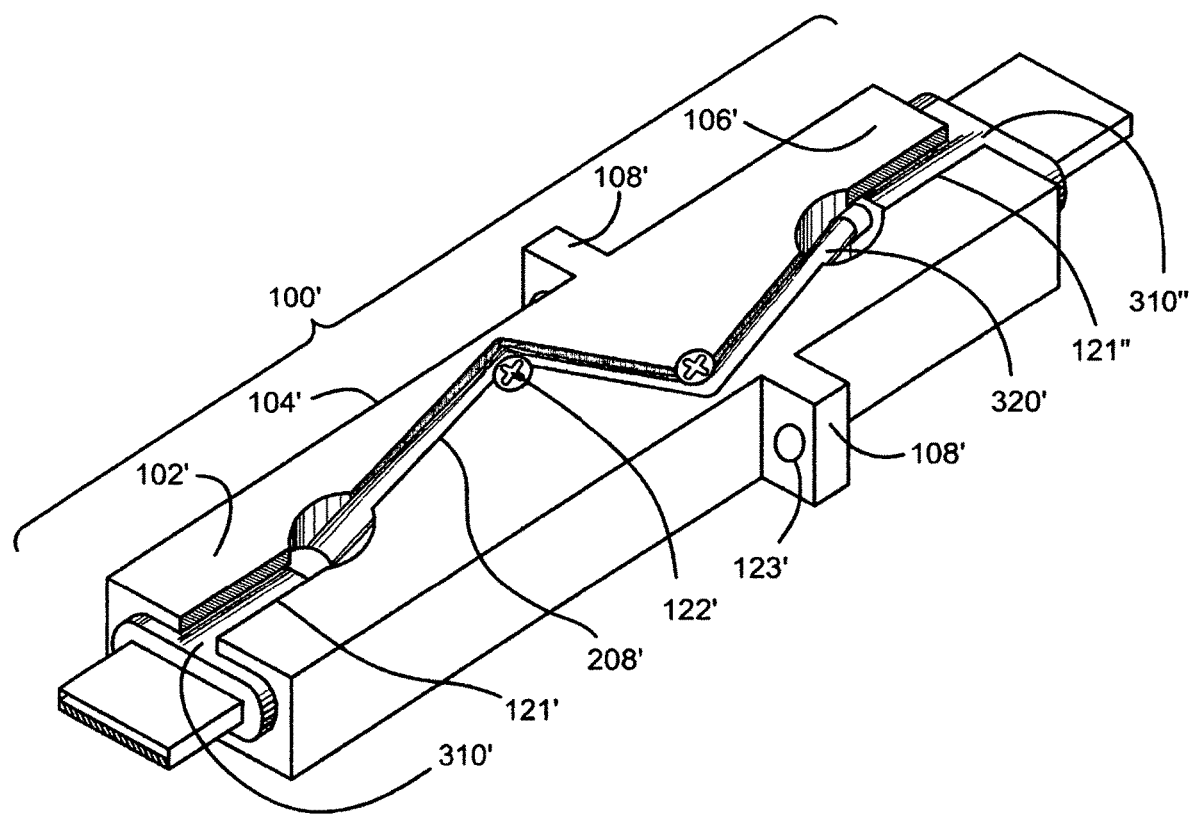
FIG. 3 is an abridged perspective view of one of many possible embodiments of the Pluggable Cable Channel invention, shown in combination with a cable channel that may be used with the invention and an elongated plug body length that has two clip-less terminus sockets.

FIG. 3 illustrates another embodiment of the Pluggable Cable Channel in which two terminus, 310' and 310", and the entire cable channel length 320' are held in one elongated plug body 104'. 2 clip-less terminus sockets are present opposite each other and adjacent to each distal end 102' and 106' in order to socket each terminus stationed relative to the elongated plug body 104'. This embodiment of the Pluggable Cable Channel where two clip-less terminus sockets are present in one plug body length forms a pluggable cable bus-channel. The second clip-less terminus socket adjacent to the second distal end 106' can be of similar or different dimension than the clip-less terminus socket at the first distal end 102'. Assembling of a cable channel into this embodiment is similar to that of other Pluggable Cable Channel embodiments. A of cable channel length 320' is passed through one of the notchless cable channel passing keyway slots 310' and 310", and then the other, and into the clip-less terminus socket adjoined with the associated notchless cable channel passing keyway 121' and 121". Next a first terminus of the cable channel 310' or 310" is seated into a first clip-less terminus socket with the terminus bottom shoulder being inserted first then seated to the clip-less terminus socket floor. The same procedure is applied to the second terminus at the opposite distal end of the cable channel. The remaining length of the cable channel 320' is then seated into the surface channel passageway 208'. The channel clamp feature 122' is set via initial rotation reducing the opening of a portion of the surface channel passageway, holding a cable channel portion in place along the elongated plug body. One end of the elongated plug body of this embodiment can be assembled in a first encasement channel-way recess and fastened to the encasement while the opposite end can be assembled in the channel-way of a second associated encasement channel-way. Fastening to an encasement is supported via the cavities 123' of the body tabs 108'.

Figure 4:
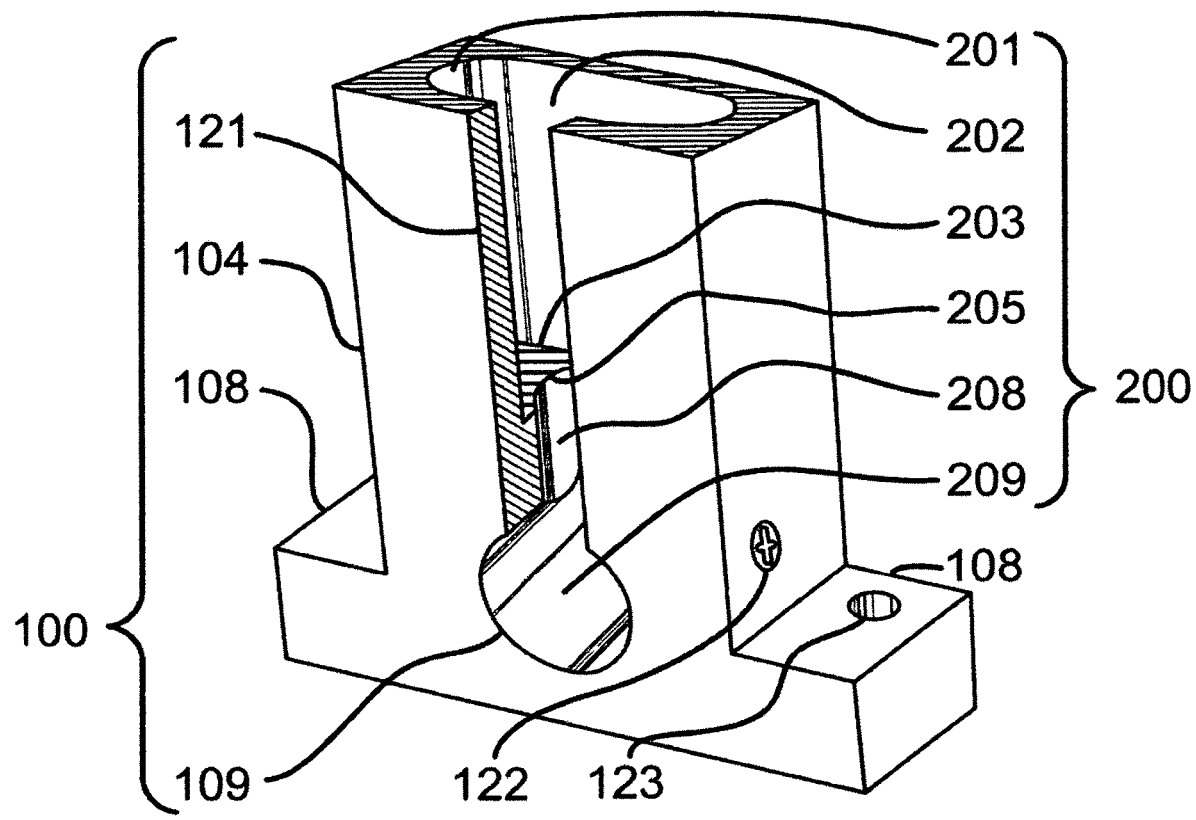
FIG. 4 is an abridged perspective view of one of many possible embodiments of the Pluggable Cable Channel, illustrated to show some of the internal features of the cable channel conduit in the elongated plug body length of the invention.

FIG. 4 illustrates a three-dimensional perspective drawing of a Pluggable Cable Channel embodiment seen from an angle of view through the cable channel passing keyway slot 121 into a cable channel conduit 200 of the elongated plug body 104. A cable channel conduit is comprised of a clip-less terminus socket 202, a holed wall 203 forming the floor of the clip-less terminus socket 202, a C-shaped cable channel passageway 208, and optionally, as in this embodiment, a cable channel routing passageway 209. The concave surface 201 of the inside cylindrical walls in the clip-less terminus socket 202 combine with a bottom floor formed with a holed wall 203 to form a socket that holds a cable channel terminus stationed in place relative to the elongated plug body 104. The holed wall 203 separates the cable channel conduit into two sections. The clip-less terminus socket section 202 and a C-shaped cable routing channel section 208. The C-shaped cable channel passageway can include a cable routing channel 209. A cable channel routing passageway 209 can traverse from one side of the elongated plug body length to the opposite side intersecting a portion of the C-shaped cable channel passageway 208 to form a third section of the cable channel conduit 200. To assemble a cable channel into the cable channel conduit of this Pluggable Cable Channel embodiment, a portion of the cable channel's length is passed into the cable channel conduit 200 of the elongated plug body length 104 through the cable channel passing keyway slot 121. The cable channel terminus is then axially inserted down into the clip-less terminus socket 202 bottom shoulder first, until the terminus bottom shoulders seat against the holed wall 203 that forms the clip-less terminus socket 202 floor 203. The cable channel length seats in the C-shaped cable channel passageway 208, which in this embodiment conveys a portion of the cable channel length from the clip-less terminus socket into the cable channel routing passageway 209. The cable channel exits the cable channel conduit exit point 109 in this present embodiment guided by the angle of the cable channel routing passageway 209. A channel clamp 122 is then set via rotation in order to secure a portion of a cable channel to a point along the cable channel conduit. Alternatively the channel clamp can be located adjacent to the cable channel routing passageway 209 as shown, or the cable channel conduit 208. When used in conjunction with a cable channel that has been assembled to the Pluggable Cable Channel as described, the Pluggable Cable Channel can be inserted into the recess of an encasement channel-way. Semi-permanent attachment may be accomplished via the use of fasteners applied through the cavities 123 of a base tab 108.

Figure 5:
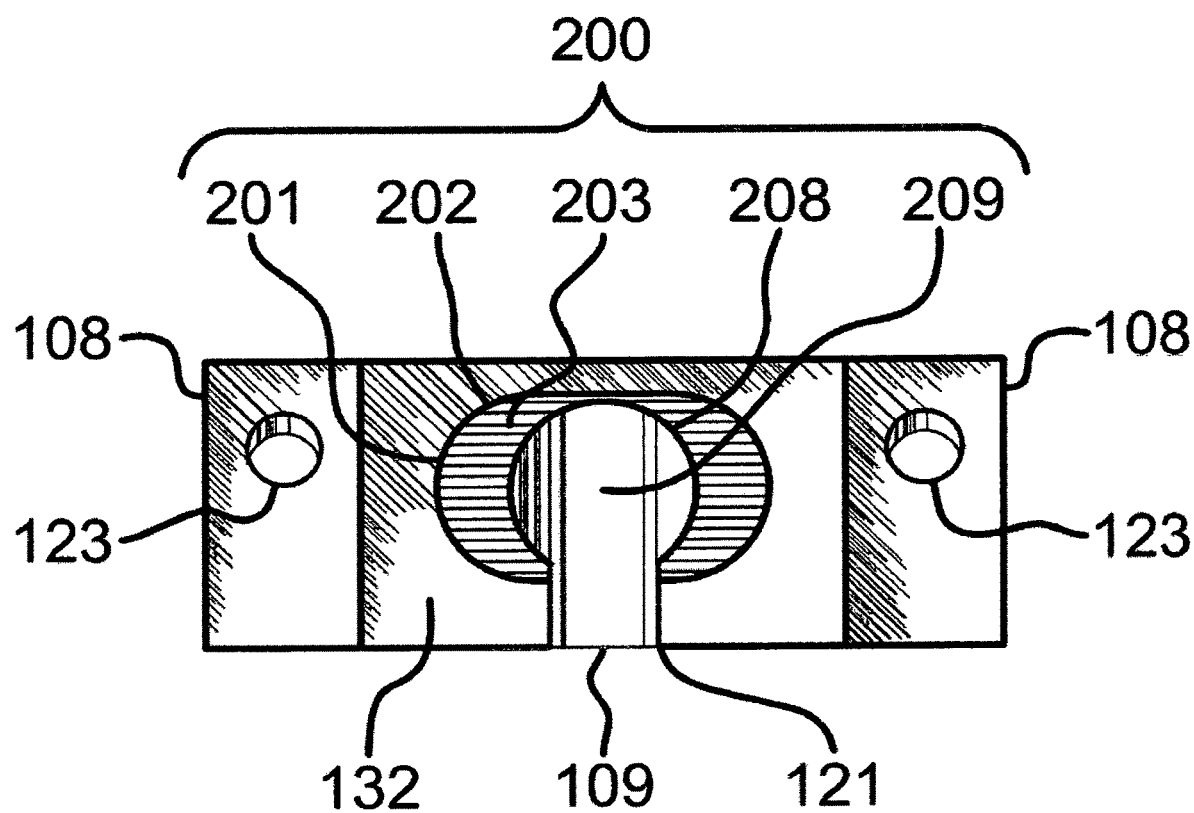
FIG. 5 is an abridged top view of one of many possible embodiments of the Pluggable Cable Channel invention.

FIG. 5 is a top view of one of many possible invention embodiments looking down past the top end tip surface 132 through the clip-less terminus socket 202 with concave cylindrical walls 201, through the holed wall 203, into the C-shaped cable channel passageway 208, down into the cable channel routing passageway 209, then out the cable channel conduit exit point of this present embodiment at 109 below the cable passing keyway slot 121. As shown in this present embodiment, base tabs 108 can be radially attached to a base end of the elongated plug body. The base tabs can attach a Pluggable Cable Channel to an encasement and the base tab cavities 123 can be used to fasten the Pluggable Cable Channel to an encasement fastening mechanism.

Figure 6:
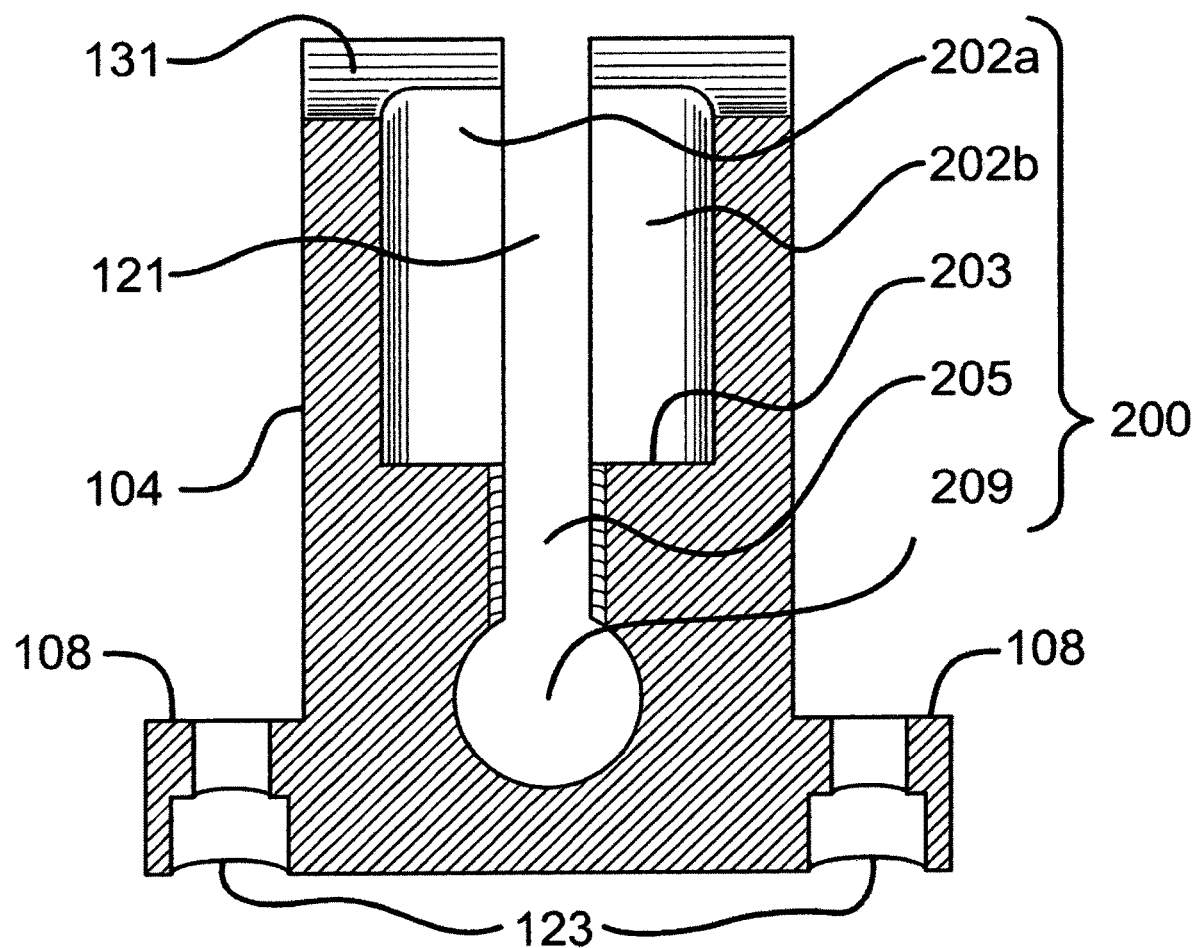
FIG. 6 is an abridged front cross section of one of many possible embodiments of the Pluggable Cable Channel invention.

FIG. 6 is a front cross sectional view of one of many possible Pluggable Cable Channel embodiments. Further detail of a cable channel conduit 200 is observed with this view. The clip-less terminus socket with convex surfaces of the inside cylindrical back walls 202*a* and 202*b*, hold the cable channel terminus stationed in place seated against, the holed wall 203 that forms the floor of the clip-less terminus socket. With this embodiment the upper C-shaped cable channel passageway 205 coveys a length of cable channel, often including a hosel, from the base of the clip-less terminus socket at the holed wall 203, to the cable channel routing passageway 209, guiding a length of cable channel out of the cable channel conduit at the cable channel conduit exit point. Similar to other Pluggable Cable Channels, the cable channel passing keyway slot 121 enables a length of cable channel to be passed into the cable channel conduit 200. After the cable channel length is passed into the cable channel conduit allowing a length of cable channel to be passed into the C-shaped cable channel passageway, the terminus can be stationed in the clip-less terminus socket. In this embodiment fasteners through the cavities 123 of the base tabs 108 can be used to fasten the Pluggable Cable Channel into an encasement channel-way with associated encasement fastening mechanisms. The distance from the holed wall 203 that forms the clip-less terminus socket floor, to the clip-less terminus socket end tip 131 at a first distal end of the elongated plug body, as well as the clip-less terminus socket's width and thickness can be adjusted on an embodiment to embodiment basis. The elongated plug body 104 length, width and thickness, can also be adjusted on an embodiment implementation-to-implementation basis. These adjustments can be made to accommodate different cable channel terminus sizes and electrical interface positions.

Figure 7:
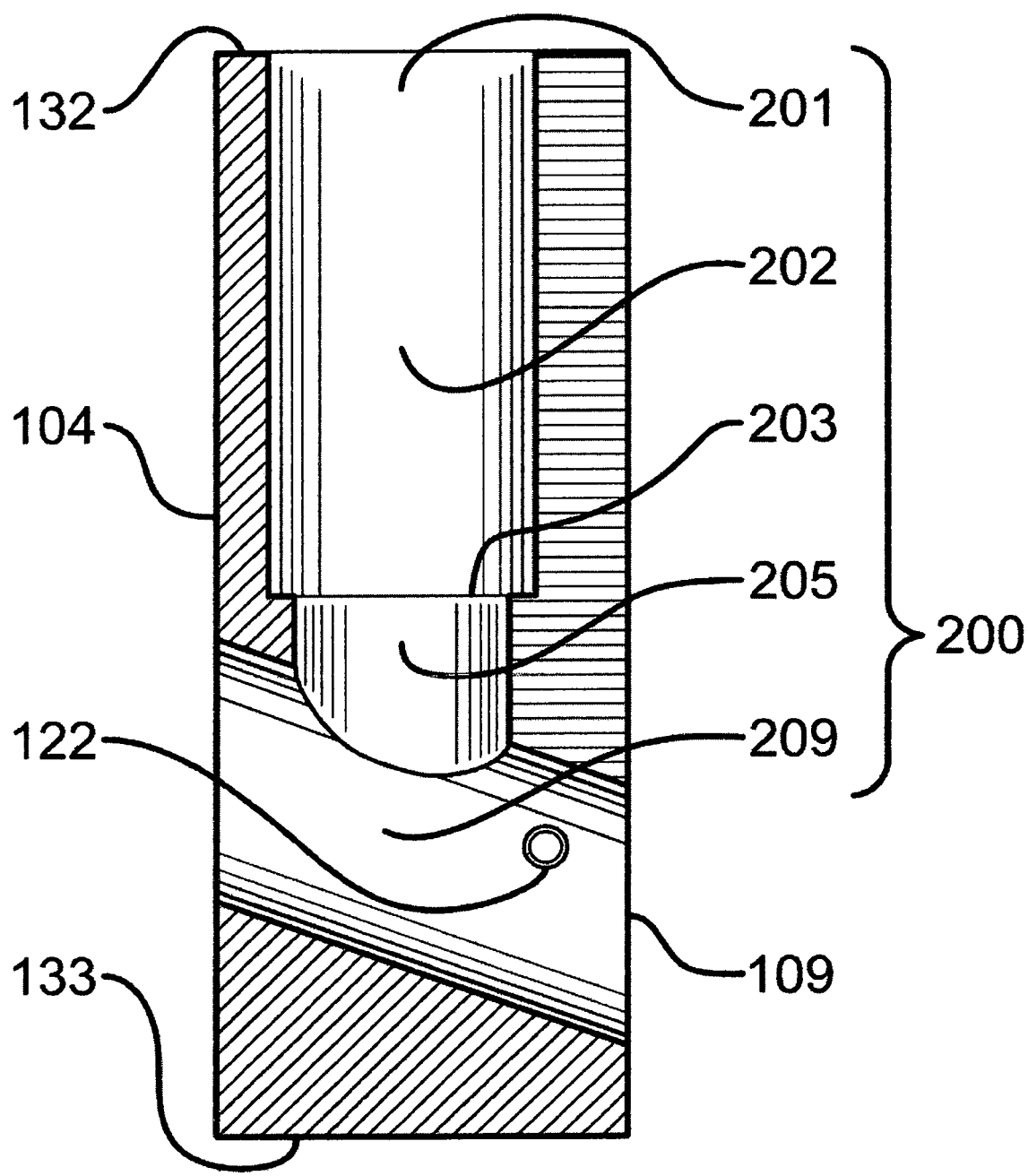
FIG. 7 is an abridged side cross section of one of many possible embodiments of the Pluggable Cable Channel invention.

FIG. 7 shows a side cross section of one of many possible embodiments to further detailing one of many possible configurations of a Pluggable Cable Channel's cable channel conduit 200. The cable channel conduit 200 includes a clip-less terminus socket 202, a holed wall 203 that forms the floor of the clip-less terminus socket, the C-shaped cable channel passageway 205, and optionally the cable channel routing passageway 209. The holed wall 203 divides the cable channel conduit into a first section comprising the clip-less terminus socket 202 and a second section comprising the C-shaped cable channel passageway 205. In the first section the concaved surfaces of the clip-less terminus socket 202 mate with convex surfaces of a cable channel terminus at a first distal end of the elongated plug body. A cable passing keyway slot, cross sectioned in this embodiment illustration, enables a length of cable channel to pass into the cable channel conduit from the outside of the elongated plug body 104 while enabling the cable channel terminus to be stationed on the inside of the elongated plug body 104 in the clip-less terminus socket 202. The clip-less terminus socket 202 receives a cable channel terminus axially via top loading of the terminus into the clip-less terminus socket opening 201. The holed wall 203 forms the floor of the clip-less terminus socket allowing a length of cable channel to pass further into the cable channel conduit 200 through the hole of the holed wall 203 that forms the beginning of the upper C-shaped cable channel passageway 205, while holding the terminus seated in the clip-less terminus socket 202. The beginning of An upper C-shaped cable channel passageway 205 forms the hole of the holed wall. and the beginning of a second section of the cable channel conduit starting opposite the holed wall 203, from the clip-less terminus socket 202. The C-shaped cable channel passageway 205 conveys a cable channel toward the cable channel conduit exit point 109 of the elongated plug body length 104. In this embodiment an optional cable channel routing passageway 209 traverses from one side of the the the elongated plug body 104 to the opposite side changing the cable channel conduit path toward a cable channel exit point 109 on the side of the elongated plug body. The cable channel routing passageway's 109 traversing angle to the elongated plug body 104 can vary on an embodiment implementation to implementation basis from between being perpendicular to the elongated plug body length, to being implemented to within 5 degrees from the elongated plug body length's axial centerline. A cable channel routing passageway traverses from one side of the elongated plug body to the opposite side with the traversing angle depending on the orientation requirements of the cable channel upon exit of the Pluggable Cable Channel at 109. The cable channel routing passageway 109 can provide an exit path to guide the cable channel to a location internal to the associated encasement, or externally to the associated encasement by varying the angle of the cable channel routing passageway. Embodiments can include one or more threaded cavities 122 along the elongated plug body 104 into a section of the cable channel conduit that can be used to set a channel clamp to secure a portion of a cable channel in place along the elongated plug body length 140. Embodiments can have a base end tip surface 133, at the end of a second distal end of the elongated plug body, and a top end tip surface 132 adjoining a clip-less terminus socket at the end tip of a first distal end of the elongated plug body, opposite the second distal end, that are angled in parallel 90 degrees perpendicular to axis of the elongated plug body length 140.

Figure 8:
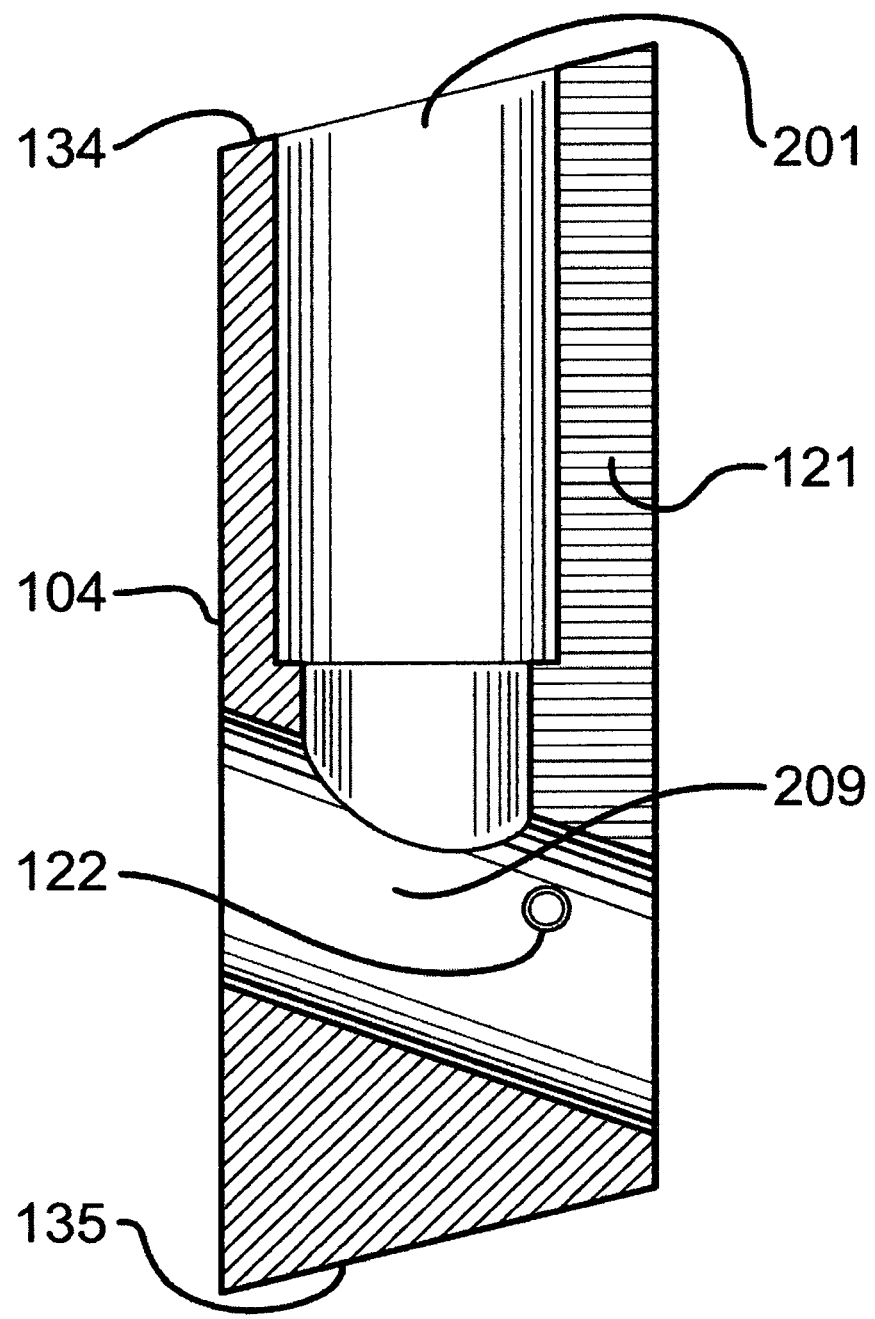
FIG. 8 is an abridged side cross section of one of many possible embodiments of the Pluggable Cable Channel. This present illustration highlights an angled base end tip surface and a top end tip surface adjoining an clip-less terminus socket.

FIG. 8 Still other embodiments of the Pluggable Cable Channel may be used in an encasement where the channel-way recess into the encasement, designed in conjunction with the elongated plug body 140, is angled into the encasement away from the encasement surface plane at an angle other than 90 degrees perpendicular to the encasement surface. In these embodiment implementations a base end tip surface 135 at the end of a second distal end of the elongated plug body, and the top end tip surface adjoining the clip-less terminus socket at the end of a first distal end of the elongated plug body opposite the second distal end can have end tip surfaces on parallel planes at an angle other than 90 degrees in relationship to the axis of the elongated plug body length 140, to accommodate a flush finish of the base end tip 135 and the top end tip 134 surfaces to the associated encasement surface planes, or accommodate the body of an encasement attaching to a cable channel's electrical interface when one is assembled with the invention. When used in conjunction with a cable channel length passed into the cable channel conduit through the cable channel passing keyway slot 121 and assembled to the elongated plug body and seated in the cable channel conduit, a channel clamp may be applied into the threaded cavity 122 and serve as a cable channel conduit guide, a channel clamp mechanism or both, to secure a section of a length of the cable channel to a point along the elongated plug body length.

Figure 9:
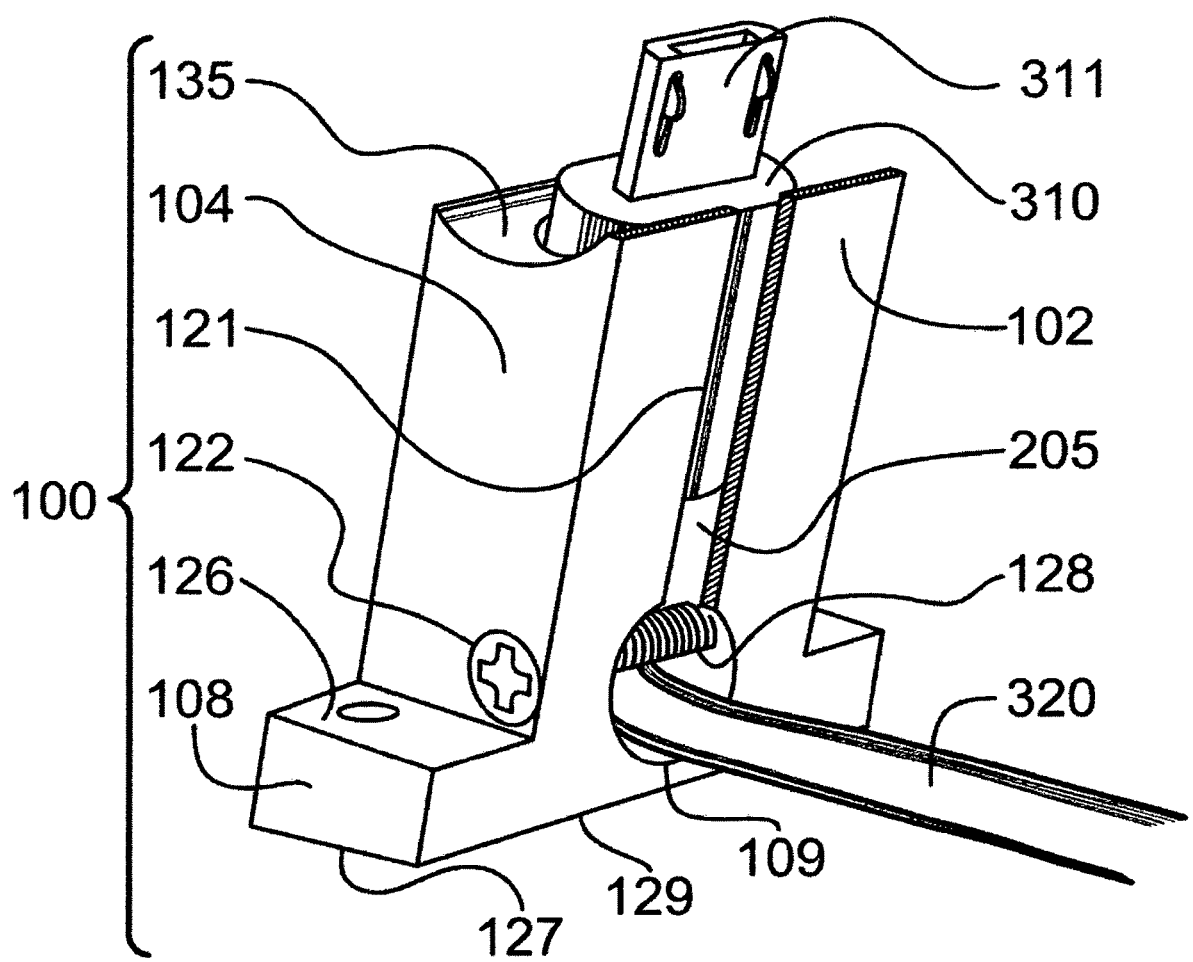
FIG. 9 is an abridged perspective view of one of many possible embodiments of the Pluggable Cable Channel. This present illustration highlights the invention in conjunction with a cable channel.

FIG. 9 is a perspective view of one of many embodiments of the invention further highlighting details of a Pluggable Cable Channel when used in conjunction with a cable channel. Similar with other embodiments, a notchless keyway slot 121 extends from a first distal end 102 along the longitudinal axis of the elongated plug body 104 toward the base 129 enabling the passage of a length of cable channel 320 into the cable channel conduit from the clip-less terminus socket adjacent to the first distal end 102, past the holed wall, into the C-shaped cable channel passageway 205 opposite the holed wall from the clip-less terminus socket, and through the cable channel conduit exit point 109. The axially loading clip-less terminus socket disposed in a first section of the cable channel conduit adjacent a first distal end 102, opposite of the base 129, holds a seated cable channel terminus 310. A length of cable channel passed through the keyway slot 121, is seated in a C-shaped cable channel passageway 205. An optional third section of the cable channel conduit, a cable channel routing passageway, is present in this embodiment. A cable channel routing passageway changes the direction of a length of cable channel in the cable channel conduit, guiding the length of cable channel in a different direction from the C-shaped cable channel passageway toward the cable channel conduit exit point 109. A progressive clamping feature 122 is rotated and set to hold a length of cable channel to a point along the elongated plug body length 104. In the present embodiment the shaft of a channel clamp feature 128 functions as a mechanical means of retaining a length of cable channel in a portion of the cable channel conduit, while the direction of the cable channel length is changed via the guidance of the cable channel routing passageway portion of the cable channel conduit, and as a clamping mechanism to secure a point along the length of the cable channel to a point in the cable channel conduit by applying clamping pressure between the progressive clamping feature shaft 128 and a wall of the cable channel conduit. Other embodiments may apply the clamping function with other clamping surfaces of the channel clamp. When a Pluggable Cable Channel is to be inserted into a recess of an associated channel-way aft first distal end 102 of the elongated plug body 104 holding a terminus 310 is inserted into the associated encasement channel-way. In this embodiment insertion into the channel-way is complete when the base tabs 108 touch to the attaching surface. Fasteners can be applied to the base tabs 108 in a proximally facing direction through the cavities of the base tabs. When the Pluggable Cable Channel is used with an associated channel-way recess angled at other than 90 degrees away from an encasement surface plane, the proximally facing surfaces of the base tabs 126 at the end of the second distal end of the elongated plug body adjacent to the base 129 can remain angled at 90 degrees to the longitudinal axis of the elongated plug body while the base end tip surfaces 127 opposite the proximally facing base tab surfaces can be angled parallel to the associated encasement surface plane. Another feature of this present embodiment is the concaved surface 135 of the elongated plug body end tip surface at the end of a first distal end of the elongated plug body 102 allowing a close mating of encasements with a convex surface. The clip-less terminus socket holds the electrical interface 311 in a stationary position while the Pluggable Cable Channel is implemented beyond the entrance surface of an associated channel-way.

The methods of manufacturing the Pluggable Cable Channel include, however are not limited to, CNC milling, metal injection molding (MIM), and plastic injection molding. The channel-way and fastening mechanism of an associated encasement design, into which recess the Pluggable Cable Channel is inserted and attached, provide structural support to the length of the Pluggable Cable Channel body, which can be taken into account for determining the dimensional strength requirements of the final production manufacturing material set. Characteristics of the attaching electrical interface such as the attaching interface being stationary or removable, the insertion force required to plug into the interface, vibration during operation, angles of engagement, encasement grounding path requirements, thermal dynamics of the operating environment, total cycles during lifetime, as well as all possible angles of removal, can all be taken into account in order to select the material set and terminus cavity options to be used per invention application into one of the many possible embodiments.

With the Pluggable Cable Channel as described here in the detailed description of the invention, and supported by the drawings FIG. 1-FIG. 9, a Pluggable Cable Channel conduit that converts a standard electronic cable into an elongated pluggable data channel for extended reach and secure fastening to electronic devices has been created.

Those skilled in the art will find the present invention capable of being embodied in other specific forms without changing the basic characteristics thereof. A number of specific embodiments have been disclosed and therefore with this knowledge, now a person skilled in the art can conceive through review of this disclosure, other embodiment possibilities by combining features of one embodiment with another, subtracting embodiment features, as well as separating them. These equivalent embodiments are intended to be encompassed by the following claims.

What is claimed is:

1. A pluggable cable channel comprising:
   an elongated plug body forming a C-shaped protective sheath around a cable channel conduit along a length of said elongated plug body;
   a holed wall disposed in said cable channel conduit dividing said cable channel conduit into two sections;
   a clip-less terminus socket forming a first section of said cable channel conduit adjacent to a first distal end of said elongated plug body length;
   a C-shaped cable channel passageway in a second section of said cable channel conduit opposite said clip-less terminus socket from said holed wall;
   a base end at a second distal end of the elongated plug body opposite the first distal end comprising said elongated plug body axially extending away from said base; and
   a notchless cable channel passing keyway slot disposed on a side of said elongated plug body along the longitudinal axis from a first distal end adjoining said clip-less terminus socket extending toward said base to a point on the opposite side of said holed wall from said axially loading terminus cavity.

2. The pluggable cable channel set forth in claim 1 further comprising a cable channel assembled into said elongated plug body length wherein a concave surface of said clip-less terminus socket's inside cylindrical walls mate with a convex surface of a cable channel terminus to station a cable channel terminus in a fixed position in said clip-less terminus socket.

3. The pluggable cable channel set forth in claim 2 further comprising a a cable channel terminus disposed in said clip-less terminus socket and seated against said holed wall and a length of cable channel is disposed within said C-shaped cable channel passageway wherein the cable channel terminus remains uncovered while the terminus electrical interface is held stationary in relationship to said elongated plug body.

4. The pluggable cable channel device set forth in claim 1 wherein a base end tip surface at the end of a second distal end of said elongated plug body length and a top end tip surface at the end of a first distal end of said elongated plug body length, opposite the second end, adjoining said axially loading terminus socket, are angled in parallel to between 89 to 60 degrees in relation to the axial direction of said elongated plug body.

5. The pluggable cable channel set forth in claim 4 wherein said base end further comprises a first base tab adjoined radially to said base end 180 degrees apart from a second base tab wherein both project outward from the opposite sides of said elongated plug body length wherein said first base tab and said second base tab have proximally facing surfaces both on a single plane 90 degrees to the axis of said elongated plug body length while said first base tab and said second base tab end tip surfaces, opposite the proximally facing surfaces adjoined to said base end tip surface, are angled between 89 to 60 degrees in relation to the axis.

6. The pluggable cable channel device set forth in claim 5 further comprising a threaded cavity traversing each of said first base tab and said second base tab from the proximally facing surfaces to the end tip surfaces, the end tips surfaces adjoining said base end tip surface.

7. The pluggable cable channel device set forth in claim 5 further comprising a cavity traversing each of said first base tab and said second base tab from the proximally facing surfaces to the end tip surfaces, the end tips surfaces adjoining said base end tip surface.

8. The pluggable cable channel device set forth in claim 1 further comprising a channel clamp disposed adjacent to a location along said cable channel conduit wherein rotation of said channel clamp feature reduces an opening of the adjacent passageway of said cable channel conduit.

9. The pluggable cable channel device set forth in claim 1 wherein said top end tip surface, at the end of a first distal end of said elongated plug body length, adjoining said axially loading terminus socket, forms a concave surface.

10. The pluggable cable channel set forth in claim 1 further comprising a cable channel routing passageway traversing from one side of said elongated plug body to the opposite side at an angle less than 90 degrees and greater than 5 degrees from the longitudinal axis of said elongated plug body length intersecting a portion of said C-shaped cable channel passageway forming a third section of said cable channel conduit.

* * * * *